United States Patent
Moss et al.

(10) Patent No.: US 11,937,617 B2
(45) Date of Patent: Mar. 26, 2024

(54) SYSTEM AND METHOD FOR COATING SOFT AND STICKY FOOD CORES

(71) Applicant: General Mills, Inc., Minneapolis, MN (US)

(72) Inventors: James Andrew Moss, Trenton (CA); Sorin Stingaciu, Richmond Hill (CA)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 17/943,468

(22) Filed: Sep. 13, 2022

(65) Prior Publication Data

US 2023/0083723 A1    Mar. 16, 2023

Related U.S. Application Data

(60) Provisional application No. 63/243,355, filed on Sep. 13, 2021.

(51) Int. Cl.
| | | |
|---|---|---|
| *A23G 3/54* | (2006.01) | |
| *A23G 3/34* | (2006.01) | |
| *A23G 3/46* | (2006.01) | |

(52) U.S. Cl.
CPC ............. *A23G 3/54* (2013.01); *A23G 3/0023* (2013.01); *A23G 3/0091* (2013.01); *A23G 3/343* (2013.01); *A23G 3/46* (2013.01)

(58) Field of Classification Search
None
See application file for complete search history.

(56) References Cited

U.S. PATENT DOCUMENTS

| | | |
|---|---|---|
| 3,692,451 A | 9/1972 | Sollich |
| 3,958,018 A | 5/1976 | Tay |
| 8,273,399 B2 | 9/2012 | Bartkowska et al. |
| 9,060,543 B2 | 6/2015 | King |
| 9,635,873 B2 | 5/2017 | Heinzen |

FOREIGN PATENT DOCUMENTS

| | | | |
|---|---|---|---|
| EP | 935926 A1 * | 8/1999 | ............... A23G 3/22 |
| EP | 3050435 | 7/2012 | |
| FR | 2970624 | 8/2016 | |

\* cited by examiner

*Primary Examiner* — Jyoti Chawla

(74) *Attorney, Agent, or Firm* — Diederiks & Whitelaw, PLC; Rachel A. Kahler

(57) ABSTRACT

A product conveying and coating system includes multiple, sequentially arranged conveyor units, with at least one conveyor unit being an open belt type. A carrier sheet is placed on a first of the conveyor units, a web of coating material in liquid form is deposited on the carrier sheet and spaced ropes of soft and sticky material are deposited on and settle into the web. The carrier sheet, web and ropes are transferred to a second conveyor unit after the coating material of the web solidifies, whereupon the ropes are cut into bar-length pieces. Thereafter, the carrier sheet is removed while the web and pieces are transferred to the open belt conveyor unit and exposed to an enrober. The enrober coats the pieces while melting portions of the web between the pieces in order to form full coated or encapsulated food products with soft and sticky cores.

20 Claims, 2 Drawing Sheets

SYSTEM AND METHOD FOR COATING SOFT AND STICKY FOOD CORES

CROSS REFERENCE TO RELATED APPLICATIONS

This application claims the benefit of U.S. Provisional Patent Application Ser. No. 63/243,355, filed on Sep. 13, 2021 and titled "System and Method for Coating Soft and Sticky Food Cores". The entire content of this application is incorporated by reference.

FIELD OF THE INVENTION

The invention pertains to the art of coating food products and, more specifically, to a system and method for enrobing extremely soft and sticky food centers or cores transported upon a series of conveyor belts.

BACKGROUND OF THE INVENTION

In the manufacturing of certain food products, it is sometimes desired to provide a coating on the food products. For instance, topical coatings are quite common on a wide range of food products. The overall coating process can significantly vary, particularly depending on the coating material being employed and the food product surfaces to be coated. For instance, in the case of topical coatings, whether in particulate or liquid form, it is common to provide a feed hopper or other dispenser above the food product as the product moves along a conveyor. In such an arrangement, the conveyor belt is generally formed of interconnected metal wires or links which enables most of the excess coating material to fall or flow through the conveyor belt and collected for reuse. If it is desired to coat the entire food product, the food product can be directed through an enrober, wherein coating material is basically poured on the product, with excess coating material flowing through an open mesh conveyor.

Specific problems exist in connection with attempting to commercially manufacture food products requiring the coating of sticky food cores or bases. In particular, special provisions must be made to prevent the food cores from sticking directly to the conveyor. Certainly, parchment paper has been used in the food industry to convey sticky and other products along a production line. However, parchment paper cannot be used in connection with supporting a product through an enrobing process as excess coating material would be prevented from flowing through the conveyor. For at least this reason, in coating of sticky products, the industry has been led to initially applying a layer of the coating material on a solid surface, such as at least partially upon a plate as set forth in U.S. Pat. No. 3,692,451 or a solid belt as set forth in U.S. Pat. No. 9,635,873, and then dispensing the sticky material on the coating material. In this way, the layer of coating material functions to space the sticky core material from the conveyor. Of course, this assumes that the coating material is not sticky. Even further issues arise when the core material is soft, e.g., having the consistency of yogurt or pudding. Under these circumstances, the core material, when dispensed, will inherently tend to collapse. Even more problematic is retaining the core material as a coherent body as the food product is conveyed between multiple different conveyors as is typically a requirement in connection with the production of food products between processing stations in a commercial manufacturing setting. With the above in mind, there is considered still exist a need in the art for an efficient and effective system for continuously producing food products including a soft and sticky food core enrobed in a coating material in a commercial environment wherein at least the core must be transported intact between multiple conveyors during the overall process.

SUMMARY OF THE INVENTION

The invention is directed to a system and method for producing food products including an enrobed a soft and sticky food core. The system employs at least first and second, sequentially arranged open conveyor belts, wherein the soft and sticky food core is dispensed on the first conveyor belt, thereby requiring the transfer of the soft and sticky food core to at least the second conveyor belt during the overall production process. More specifically, initially a carrier sheet, which is constituted by parchment paper in a preferred embodiment, is provided atop the first conveyor belt and then a thin base layer of a coating material is deposited in a liquid state as a sheet or web across the parchment paper. Prior to thin layer solidifying, the soft and sticky food core material is extruded, preferably just downstream of the location of coating deposition, as strips or ropes onto the thin layer of coating material, with the soft and sticky food core settling into the thin layer, effectively supporting the soft and sticky core material and enabling the soft and sticky core material to maintain its structural integrity and shape.

In the next phase of the production process, the thin layer of coating material solidifies. This solidifying phase can be accomplished through natural heat transfer as the soft and sticky food core travels along the first conveyor belt upon the thin layer of coating material and the parchment paper for a requisite time period or the combination of core, thin base coating and parchment paper can be directed through or across a cooling unit to more rapidly solidify the coating material. In either case, in accordance with the invention, the entire web of thin base coating is solidified prior to transfer of the set soft and sticky food core to the next, second conveyor belt. Once the web is solid, it has been found that, in combination with the parchment paper, it is safe to transfer the soft and sticky core material set in the thin coating material off the first conveyor belt and onto the second conveyor belt, and even beyond to another conveyor belt, without tearing or otherwise deforming the still soft core material.

In connection with the overall production process, an enrober is provided on the second or a subsequent conveyor belt, herein referred to as the enrober belt which is an open conveyor belt such as a mesh metal belt. Just prior to the enrober belt, the parchment paper is deflected so that the soft and sticky core material is directly supported on the enrober belt by the solid web of thin coating material. Either prior to or in conjunction with the enrobing process, a cutter separates the core material into individual pieces (bars or strips) for coating. In the enrober, additional coating material is deposited in a heated liquid or molten state over the individual pieces of soft and sticky core material. Importantly some of the heat associated with the enrobing process also functions to melt the web of thin coating material between the soft and sticky core material. As this conveyor belt is open, the excess coating material, including the excess enrobing material and the coating material from the web which is not directly bottom coating the soft and sticky core material, flows through the mesh conveyor belt and is preferably collected, filtered and recycled back to, for example, a coating distribution manifold.

In accordance with a particular embodiment of the invention, the core material constitutes a yogurt or pudding, although other soft and sticky food materials could be employed, and the coating material is chocolate. The thickness of the thin coating web layer depends on the desired coating weight and is preferably about 2-9 mm for initially bottom coating the soft and sticky food core. Upon reaching a downstream end of the enrober belt, the coated bars are cooled under a predetermined cooling temperature environment and residence time prior to the resulting food product being wrapped or otherwise packaged.

Overall the invention provides a reliable and effective arrangement for producing a variety of coated food products having soft and sticky cores, employing coating materials which can be heated and cooled to alter viscous characteristics thereof, can be sheeted and conveyed. In any case, additional objects, features and advantages of the invention will become more readily apparent from the following detailed description when taken in conjunction with the drawings wherein like reference numerals refer to corresponding parts in the several views.

DETAILED DESCRIPTION OF INVENTION

Figure 1:
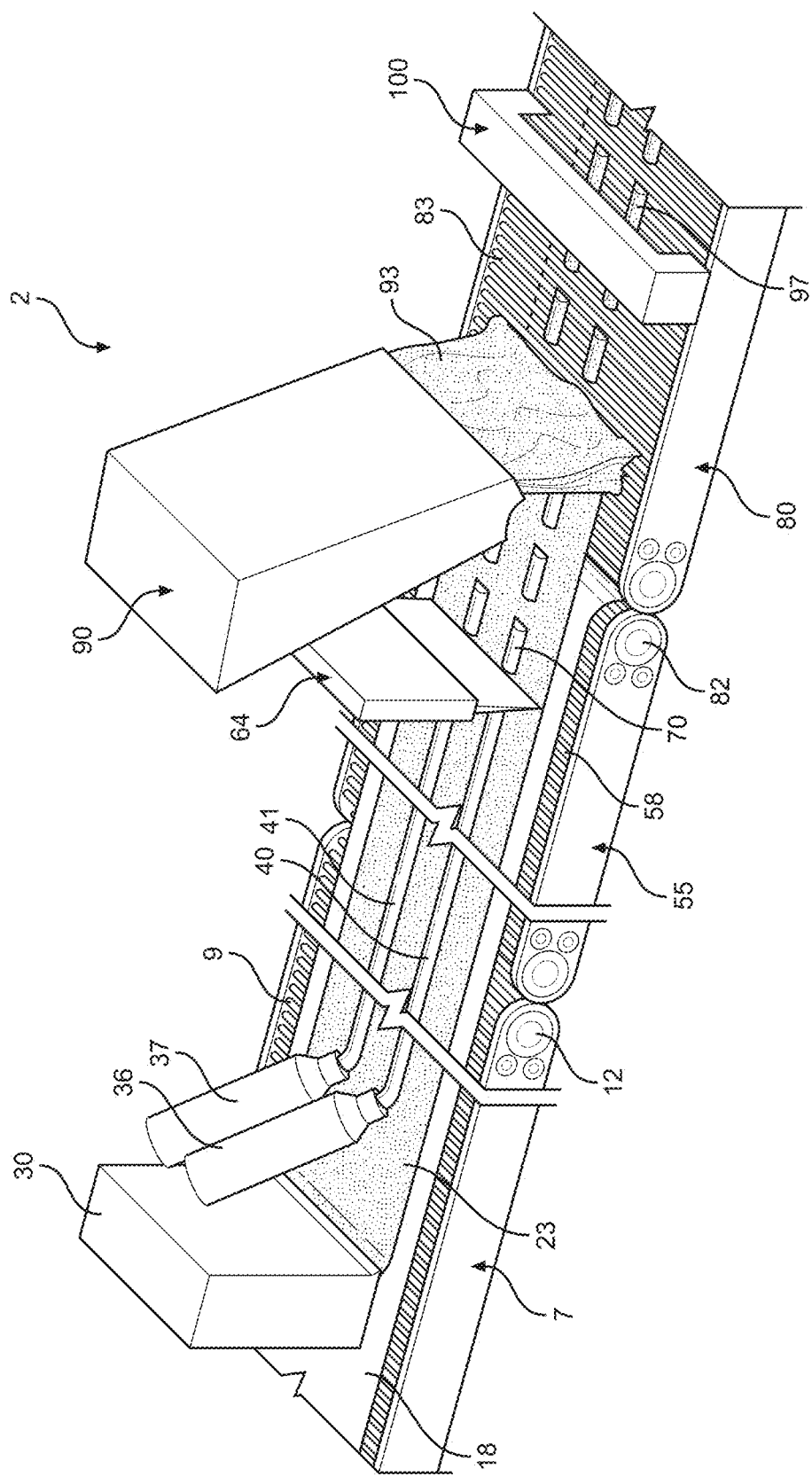
FIG. 1 is a perspective view of a food product coating and conveying system according to an embodiment of the invention.

With initial reference to FIG. 1, a food coating and conveying system constructed in accordance with the present invention is schematically illustrated and generally indicated at 2. System 2 includes a first conveyor unit 7 which employs an open conveyor belt 9. As will be discussed further below, conveyor unit 7 is only limited to have a minimum length and conveyor belt 9 is a driven, endless belt which extends around a roller 12 at one end of conveyor unit 7 and another roller (not shown) at another end of conveyor unit 7. Extending laterally across a substantial portion of conveyor belt 9 for concurrent movement is a flexible carrier sheet 18. In a particularly preferred form of the invention, carrier sheet 18 is constituted by parchment paper, however other non-edible carrier sheet materials could be employed. Deposited across carrier sheet 18 is a base coating or web 23 from a dispenser 30. In a preferred embodiment, web 23 is constituted by a thin, e.g., approximately 1 mm thick, coating layer of chocolate. However, other edible, preferably fat-based or compound, coating materials which meet the various criteria set forth further below could be employed.

Just downstream of dispenser 30 are arranged one or more extruders 36, 37 for depositing a series of laterally spaced ropes, two of which are shown at 40 and 41. At this point it should be noted that, important to the invention, ropes 40 and 41 define soft and sticky edible cores for the products being made. By way of example, the core material can be constituted by yogurt, pudding or other creamy substance. Basically, the core material has the consistency and inherent characteristics of these exemplary foods so as to be incapable of being extruded directly onto conveyor belt 9 without structurally deforming and actually sticking to open conveyor belt 9. However, due to the presence of carrier sheet 18 and web 23, which at this point is somewhat thick so it does not tend to run off carrier sheet 18 but is still in a liquid state, ropes 40 and 41 substantially maintain their extrusion shape. At best, ropes 40 and 41 flatten slightly from a circular cross-section as will become more fully evident below. However, importantly, ropes 40 and 41 do not break apart or deform laterally, but rather remain as continuous, spaced, substantially parallel ropes. In fact, the soft and sticky edible ropes 40 and 41 actually settle into the thin coating layer established by web 23, effectively supporting the soft and sticky core material and enabling the soft and sticky core material to maintain its structural integrity and shape.

Carrier sheet 18, web 23 and ropes 40 and 41 are concurrently directed toward a second conveyor unit 55. As depicted, first conveyor unit 7 can be of indeterminant length. However, it is important in connection with the present invention that the coating material of web 23 solidifies prior to a transfer onto second conveyor unit 55. If this cooling of the coating material of web 23 is preformed naturally, the environment in which food coating and conveying system 2 is located will determine the requisite length, which actually could be over 30 meters. However, if a shorter length is desired, a cooling unit or other measures could be readily employed. Second conveyor unit 55 is also shown to employ a driven endless, open conveyor belt 58 of indeterminate length. At this point, it is only important to note that the presence of carrier sheet 18 and the solidification of the thin coating web 23 has been found to provide for an effective and efficient transfer between successive conveyors, specifically without disrupting the integrity (breaking) of ropes 40 and 41. On second conveyor unit 55, ropes 40 and 41 are directed through a cutter unit, generically referenced at 64, and formed into food pieces, generally from bite-size to bar-length pieces, one of which is indicated at 70.

In the next phase of the production, bars 70 atop web 23 are transferred onto a third conveyor unit 80. At this point, it is important to note that carrier sheet 18 does not make this transfer but rather is directed around a roller 82 of second conveyor unit 55 and down between second and third conveyor units 55 and 80 as clearly shown in FIG. 1. Although still having some flexibility, web 23 is quite solid and enables this transfer of the now laterally and longitudinally spaced pieces 70. At this point, it should be recognized that, although conveyor belts 9 and 58 were referenced as open belts, conveyor belts 9 and 58 could be constituted by solid belts. However, third conveyor unit 80 includes a driven conveyor belt 83 which importantly is open, such as a wire rod, mesh or other type of open conveyor belt arrangement known in the art, as web 23 and pieces 70 are directed on conveyor belt 83 through an enrober depicted at 90. At enrober 90, a curtain of heated coating material 93, which is preferably but not necessarily the same material employed for web 23 (e.g., chocolate), is poured or otherwise deposited over each piece 70, as well as web 23. This process creates a further coating about the soft and sticky core material of ropes 40 and 41. At the same time, the heat associated with enrober 90 advantageously melts the portions of web 23 between pieces 70, with melted portions of the web 23 flowing through the open conveyor belt 83 and being recycled for later use. This operation results in only fully coated (coating encapsulated) food products 97 emerging. Food products 97 are then cooled, such as passing through a cooling unit indicated at 100 before proceeding on to a packaging phase (not shown) of the overall manufacturing process.

Figure 3:
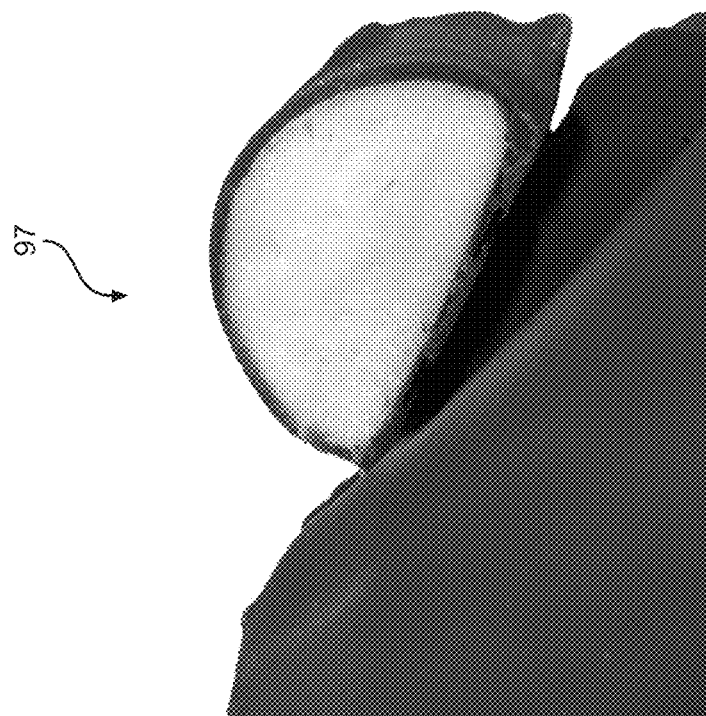
FIG. 3 is a cross-sectional view of the product of FIG. 2.
Figure 2:
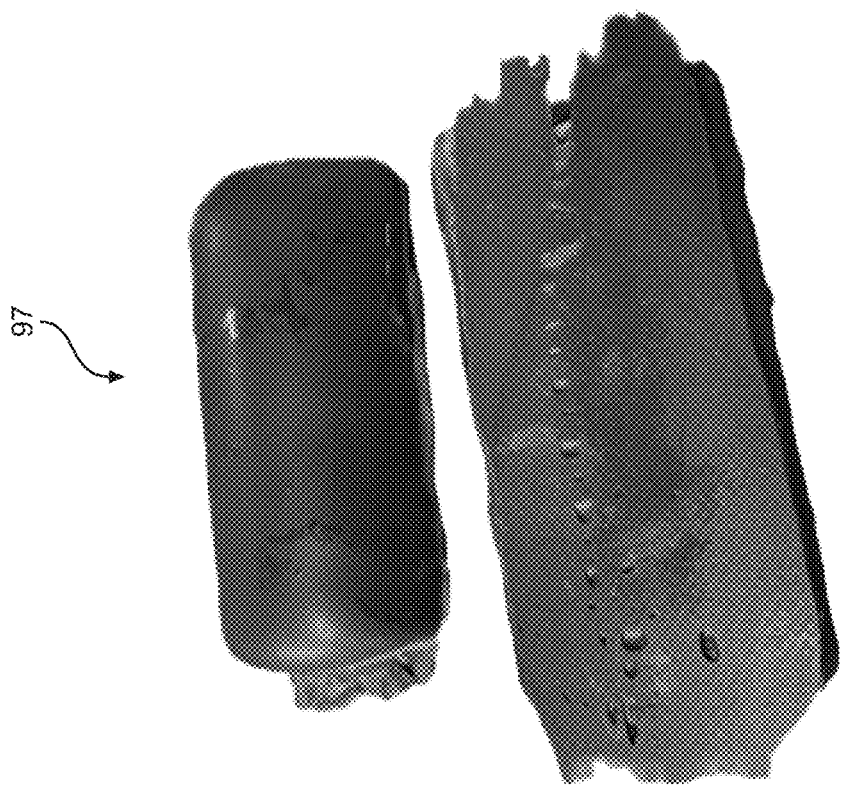
FIG. 2 is an enlarged perspective view of a product produced by the system of FIG. 1.

FIGS. 2 and 3 illustrate food products 97, generally in the form of a finished bar, produced in accordance with the invention. As seen from the cross-section of FIG. 3, food product 97 has a somewhat flattened, internal core of the soft, sticky food material and an outer shell of the encapsulating coating food material. Clearly, the thickness of the coating material is quite small compared to the diameter of the core of food product 97. In practice, the actual coating layer thickness depends on the desired coating weight. However, by way of example with a bar-type food piece, the coating can be in the order of about 1-2 mm thick, the core has crosswise dimensions ranging between about 15-40 mm, and a total length of 60-100 mm.

Although described with reference to exemplary embodiments of the invention, it should be readily understood that various changes and/or modifications can be made to the invention without departing from the spirit thereof. For instance, although three conveyor units were described, the number of conveyors can vary. However, there does exist at least one transfer with the carrier sheet and at least one without the carrier sheet. Most importantly, it has been found that employing the carrier sheet up to the point of the enrober and establishing the base web on the carrier sheet prior to depositing the core material advantageously enables the use of soft and sticky core material which will maintain its structural integrity, while not adhering to production line structure, throughout the production process.

We claim:

1. A method of producing coated food products comprising:
   applying a carrier sheet upon a first conveyor unit;
   dispensing a web of coating material laterally across a portion of the carrier sheet, with the coating material being in liquid form;
   delivering a plurality of laterally spaced ropes upon the web, with the ropes being made of a soft and sticky material;
   solidifying the coating material to form a solid web;
   transferring the soft and sticky material upon the carrier sheet and solid web onto a second conveyor unit;
   cutting the plurality of laterally spaced ropes into food pieces;
   removing the carrier sheet from beneath the solid web;
   transferring the soft and sticky material upon the solid web, without the carrier sheet, onto a third conveyor unit; and
   enrobing the food pieces while removing portions of the solid web between the food pieces in forming the coated food products having cores of the soft and sticky material.

2. The method of claim 1, wherein the third conveyor unit includes an open conveyor belt and removing portions of the solid web comprises melting the portions, with the coating material of the portions flowing through the open conveyor belt.

3. The method of claim 1, wherein the plurality of laterally spaced ropes are extruded onto the web and the cutting is performed with a cutting unit.

4. The method of claim 1, wherein the plurality of laterally spaced ropes settle into the web prior to solidifying the coating material.

5. The method of claim 1, wherein cutting the plurality of laterally spaced ropes is performed along the second conveyor unit.

6. The method of claim 1, wherein the coating material of the web is constituted by fat-based or compound coating.

7. The method of claim 6, wherein the coating material of the web is constituted by chocolate.

8. The method of claim 7, wherein the web has a thickness of approximately 1 mm.

9. The method of claim 7, wherein the food pieces are enrobed with chocolate.

10. The method of claim 1, wherein the soft and sticky material is yogurt.

11. The method of claim 1, wherein the carrier sheet is parchment paper.

12. A system for producing coated food products comprising:
   a first conveyor unit;
   a carrier sheet located on the first conveyor unit;
   a dispensing unit configured to dispense a web of coating material in liquid form laterally across a portion of the carrier sheet;
   at least one extruder configured to deliver a plurality of laterally spaced ropes made of a soft and sticky material upon the web;
   a second conveyor unit configured to receive the carrier sheet, the web in solid form and the soft and sticky material on the web;
   a cutting unit configured to cut the plurality of laterally spaced ropes into food pieces;
   a third conveyor unit configured to receive the soft and sticky material upon the solid web, without the carrier sheet; and
   an enrober configured to enrobe the food pieces while removing portions of the solid web between the food pieces in forming the coated food products having cores of the soft and sticky material.

13. The system of claim 12, wherein the third conveyor unit includes an open conveyor belt and the enrober is configured to melt the portions of the solid web, with the open conveyor belt enabling the coating material of the portions to flow there through.

14. The system of claim 12, wherein the cutter unit is provided along the second conveyor unit.

15. The system of claim 12, wherein dispensing unit is configured to dispense chocolate.

16. The system of claim 15, wherein the enrober is configured to dispense chocolate.

17. The system of claim 16, wherein the extruder is configured to dispense yogurt.

18. The system of claim 12, wherein the carrier sheet is parchment paper.

19. The system of claim 12, wherein the dispensing unit is configured to dispense the web at approximately 1 mm thick.

20. The system of claim 19, wherein the enrober is configured to establish a coating having a thickness of about 1-2 mm for the coated food products.

\* \* \* \* \*